(12) United States Patent
Hirabayashi

(10) Patent No.: US 11,460,353 B2
(45) Date of Patent: Oct. 4, 2022

(54) TEMPERATURE SENSOR AND DEVICE EQUIPPED WITH TEMPERATURE SENSOR

(71) Applicant: SEMITEC Corporation, Tokyo (JP)

(72) Inventor: Takaaki Hirabayashi, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 466 days.

(21) Appl. No.: 16/608,865

(22) PCT Filed: Apr. 18, 2018

(86) PCT No.: PCT/JP2018/015967
§ 371 (c)(1),
(2) Date: Oct. 28, 2019

(87) PCT Pub. No.: WO2018/203475
PCT Pub. Date: Nov. 8, 2018

(65) Prior Publication Data
US 2020/0200610 A1    Jun. 25, 2020

(30) Foreign Application Priority Data

May 1, 2017    (JP) .............................. JP2017-091083

(51) Int. Cl.
*G01K 7/22* (2006.01)
*G03G 15/20* (2006.01)
*H01C 1/142* (2006.01)

(52) U.S. Cl.
CPC .............. *G01K 7/22* (2013.01); *G03G 15/20* (2013.01); *H01C 1/142* (2013.01)

(58) Field of Classification Search
CPC ........... H01C 1/142; G01K 7/22; G03G 15/20
See application file for complete search history.

(56) References Cited

U.S. PATENT DOCUMENTS 3,886,578 A * 5/1975 Eastwood .............. H01C 7/041
                                                              257/769
5,207,765 A * 5/1993 Eiermann ............... G01F 1/684
                                                              374/185
(Continued)

FOREIGN PATENT DOCUMENTS

CN          105606246         5/2016
FR            2475724         8/1981
(Continued)

OTHER PUBLICATIONS

JPH0519929, Ishizuka, machine translation of the description. (Year: 1993).*

(Continued)

*Primary Examiner* — Kyung S Lee
(74) *Attorney, Agent, or Firm* — JCIPRNET

(57) ABSTRACT

Provided are: a temperature sensor capable of ensuring reliability and improving thermal responsiveness; and a device equipped with such a temperature sensor. The present invention is provided with: a surface-mounted heat sensitive element (10) having at least a pair of electrode parts (12a), (12b); lead parts (22a), (22b) that are electrically connected to the pair of electrode parts (12a), (12b) by welding; a holder (21) that holds and fixes the lead parts (22a), (22b); and an insulation coating part (23) that insulates at least a portion of the lead parts (22a), (22b) and the heat sensitive element (10). The lead parts (22a), (22b) are tabular metal plates and are formed of a metallic material having a melting point of not more than 1300° C.

19 Claims, 10 Drawing Sheets

(56) References Cited

U.S. PATENT DOCUMENTS

| | | | | |
|---|---|---|---|---|
| 6,014,073 | A * | 1/2000 | Torii | G01K 7/223 338/22 SD |
| 6,297,723 | B1 * | 10/2001 | Shoji | G01K 7/22 374/185 |
| 7,059,769 | B1 * | 6/2006 | Potega | B60L 58/21 374/185 |
| 9,829,388 | B2 * | 11/2017 | Takeda | G01K 7/16 |
| 10,809,652 | B2 * | 10/2020 | Yoshinaga | G01K 1/14 |
| 11,215,514 | B2 * | 1/2022 | Hirabayashi | H01C 1/1413 |

FOREIGN PATENT DOCUMENTS

| | | |
|---|---|---|
| GB | 874666 | 8/1961 |
| JP | H0519929 | 3/1993 |
| JP | H05258926 | 10/1993 |
| JP | 2505631 | 7/1996 |
| JP | H11211579 | 8/1999 |
| JP | 2000074752 | 3/2000 |
| JP | 2003307966 | 10/2003 |
| JP | 2008241566 | 10/2008 |
| JP | 2010197163 | 9/2010 |
| JP | 5707081 | 4/2015 |
| JP | 5763805 | 8/2015 |
| JP | 2015219396 | 12/2015 |
| JP | 2016045130 | 4/2016 |
| JP | 2016157046 | 9/2016 |

OTHER PUBLICATIONS

JP2016-157046, Mitsubishi, machine translation of the description. (Year: 2016).*

"Office Action of China Counterpart Application", dated Sep. 28, 2020, with English translation thereof, p. 1-p. 13.

"International Search Report (Form PCT/ISA/210)" of PCT/JP2018/015967, dated Jul. 24, 2018, with English translation thereof, pp. 1-4.

* cited by examiner

TEMPERATURE SENSOR AND DEVICE EQUIPPED WITH TEMPERATURE SENSOR

CROSS-REFERENCE TO RELATED APPLICATION

This application is a 371 application of the International PCT application serial no. PCT/JP2018/015967, filed on Apr. 18, 2018, which claims the priority benefit of Japan Patent Application No. 2017-091083, filed on May 1, 2017. The entirety of each of the abovementioned patent applications is hereby incorporated by reference herein and made a part of this specification.

TECHNICAL FIELD

The present invention relates to a temperature sensor which is suitable for detecting the surface temperature of a detection target, and a device equipped with the temperature sensor.

DESCRIPTION OF RELATED ART

In the related art, office automation (OA) apparatuses such as copy machines and printers, information communication apparatuses such as mobile communication terminals and personal computers, and electronic apparatuses such as video apparatuses, and consumer equipment, and electrical apparatuses for automobiles include a temperature sensor in order to detect the temperature of a detection target.

For example, a temperature sensor has been used to detect the surface temperature of a detection target constituted by a rotating body or a stationary body such as a heating roller used in a fixing device such as a copy machine or a printer and to control the temperature of the heating roller.

A schematic configuration of an example of such a temperature sensor will be described with reference to FIG. 18. As shown in FIG. 18, a temperature sensor includes a heat sensitive element 1, a pair of narrow metal plate parts 2a and 2b of such as stainless steel, Kovar. or a nickel alloy as a lead frame, a holder 3, external lead wires 4a and 4b, and an insulating sheet 5. In addition, a pair of lead wires 6a and 6b are connected to the heat sensitive element 1. Therefore, the heat sensitive element 1 is connected to the narrow metal plate parts 2a and 2b by the lead wires 6a and 6b being connected to the narrow metal plate parts 2a and 2b. The holder 3 is formed of an insulating resin material and configured to fix and hold the pair of narrow metal plate parts 2a and 2b. In addition, the external lead wires 4a and 4b are connected to ends of the pair of narrow metal plate parts 2a and 2b on the holder 3 side. Meanwhile, the heat sensitive element 1, the lead wires 6a and 6b, and the narrow metal plate parts 2a and 2b are coated with the insulating sheet 5 so as to be insulated.

With such a configuration, the number of electrical connection locations thereof is six. That is, there are a total of six such locations including connection locations (two locations) between the heat sensitive element 1 and the pair of lead wires 6a and 6b, connection locations (two locations) between the lead wires 6a and 6b and the narrow metal plate parts 2a and 2b, and connection locations (two locations) between the narrow metal plate parts 2a and 2b and the external lead wires 4a and 4b (see Patent Literature 1 to Patent Literature 5). Bonding at such connection locations is generally performed using solder, a conductive paste, or the like, and the connection locations serve as important areas in securing reliability and improving thermal responsiveness for such a type of temperature sensor.

In addition, a temperature sensor in which an electrode surface of a heat sensitive element is bonded to a tip end part of a narrow part having a small width in a pair of metal plates as a lead frame has been proposed (see Patent Literature 6). However, bonding between the narrow part of the metal plate and the electrode surface of the heat sensitive element is performed using a brazing filler metal such as a solder paste.

On the other hand, there is a lead wire electrically connected to an electrode surface of a heat sensitive element through laser welding. Since a laser beam easily causes mechanical damage to an electrode surface or an insulating substrate, a bump is formed on the electrode surface to prevent mechanical damage being caused to the electrode surface or the insulating substrate due to a laser beam (see Patent Literature 7).

Thus, in a case where bonding is performed in a state where an additional material such as a conductive paste, a brazing filler metal, or a bump is added to a connection location using the additional material for bonding, there is a problem in that a heat capacity is increased and thermal responsiveness is deteriorated.

In addition, a temperature sensor in which welding is performed by adjusting a penetration depth of a lead wire into an electrode has been proposed (see Patent Literature 8). However, there is a possibility that the manufacture of a temperature sensor will become complicated in this bonding method.

REFERENCE LIST

Patent Literature

Patent Literature 1: Japanese Patent Laid-Open No. 2000-74752
Patent Literature 2: Japanese Patent No. 5707081
Patent Literature 3: Japanese Patent No. 5763805
Patent Literature 4: Japanese Patent Laid-Open No. 2015-219396
Patent Literature 5: Japanese Patent Laid-Open No. 2016-45130
Patent Literature 6: Japanese Utility Model No. 2505631
Patent Literature 7: Japanese Patent Laid-Open No. 2008-241566
Patent Literature 8: Japanese Patent Laid-Open No. 2010-197163

SUMMARY

Technical Problem

As described above, in the case of the above-described temperature sensor of the related art, particularly, securement of reliability and an improvement in thermal responsiveness are required. Making a fixing device such as a copy machine or a printer reach a target temperature as soon as possible with low power is an essential matter of design in providing a low power consumption device, and one of the most important factors is the speed of responsiveness of the temperature sensor. This is because it is important to minimize a time lag between the temperature of a detection target and the temperature detected by the temperature sensor in order to perform optimum control for not supplying excessive power when the detection target approaches a target temperature.

The present invention is contrived in view of the above-described problem, and an objective thereof is to provide a temperature sensor capable of securing reliability and improving thermal responsiveness and a device equipped with the temperature sensor.

Solution to Problem

A temperature sensor according to a first aspect includes a surface-mounted heat sensitive element which includes at least a pair of electrode parts, lead parts which are electrically bonded to the pair of electrode parts by welding, a holder which fixes and holds the lead parts, and an insulation coating part which insulates at least portions of the heat sensitive element and the lead parts.

According to such an invention, the number of connection locations can be reduced as compared to that in the related art, reliability can be secured, and it is possible to improve thermal responsiveness by reducing a heat capacity because the pair of electrode parts of the heat sensitive element and the lead parts held by the holder are bonded together by welding.

Although an insulating film is suitably used for the insulation coating part, the insulation coating part may be formed by being coated with an insulating resin. A material and the like of the insulation coating part are not specially limited.

A temperature sensor of a second aspect is the temperature sensor of the first aspect, in which the lead parts are plate-shaped metal plates.

A temperature sensor of a third aspect is the temperature sensor of the first or second aspect, in which connection parts in the lead parts to which the heat sensitive element is bonded are formed to have smaller thickness dimensions than those of the other portions.

In order to form the connection parts so as to have small thickness dimensions, the connection parts can be formed by means such as half etching, but formation means are not specially limited.

A temperature sensor of a fourth aspect is the temperature sensor of any one of the first to third aspects, in which the lead part is formed of a metal material having a melting point of 1300° C. or less.

A temperature sensor of a fifth aspect is the temperature sensor of the fourth aspect, in which the lead part is formed of a copper alloy containing copper as a main component.

A temperature sensor of a sixth aspect is the temperature sensor of the fifth aspect, in which the lead part is formed of phosphor bronze, constantan, or manganin.

A temperature sensor of a seventh aspect is the temperature sensor of any one of the first to sixth aspects, in which thickness dimensions of the pair of electrode parts in the heat sensitive element are 1 μm or less.

A temperature sensor of an eighth aspect is the temperature sensor of any one of the first to seventh aspects, in which the heat sensitive element includes an insulating substrate having a thickness dimension of 100 μm or less.

A temperature sensor of a ninth aspect is the temperature sensor of any one of the first to eighth aspects, in which the lead part is an elastic body.

A temperature sensor of a tenth aspect is the temperature sensor of any one of the first to ninth aspects, in which the lead part is configured such that a tip end side is a narrow part having a smaller width than that of the holder side.

A temperature sensor of an eleventh aspect is the temperature sensor of any one of the first to tenth aspects, in which a cushioning material having heat resistance and elasticity abuts the heat sensitive element.

A temperature sensor of a twelfth aspect is the temperature sensor of any one of the first to eleventh aspects, in which the pair of electrode parts in the heat sensitive element include an active layer containing a high-melting point metal as a main component, a barrier layer containing a high-melting point metal as a main component formed on the active layer, and a bonding layer containing a low-melting point metal as a main component formed on the barrier layer.

A device equipped with a temperature sensor according to a thirteenth aspect includes the temperature sensor according to any one of the first to twelfth aspects.

The temperature sensor can be included in and applied to various devices for detecting the temperature of a heat generating part such as a semiconductor in fixing devices such as copy machines and printers, information communication apparatuses such as mobile communication terminals and personal computers, and electronic apparatuses such as video apparatuses, consumer equipment, and electrical apparatuses for automobiles. A device to which the temperature sensor is applied is not particularly limited.

Advantageous Effects of Invention

According to the present invention, it is possible to provide a temperature sensor capable of securing reliability and improving thermal responsiveness and a device equipped with the temperature sensor.

DESCRIPTION OF THE EMBODIMENTS

Figure 1:
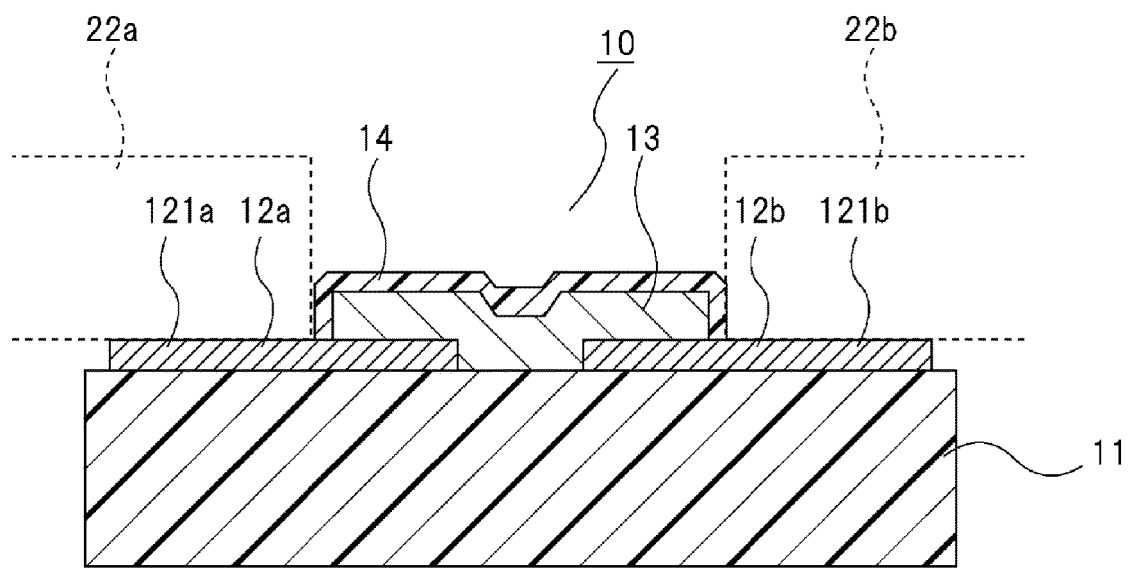
FIG. 1 is a cross-sectional view showing a heat sensitive element according to a first embodiment of the present invention.

Hereinafter, temperature sensors according to embodiments of the present invention will be described with reference to FIGS. 1 to 17. Meanwhile, in the drawings, the scale of each member may be appropriately changed for description in order to make each member have a recognizable size. In addition, the same or equivalent portions are denoted by the same reference numerals, and a repeated description thereof will be omitted.

Figure 2:
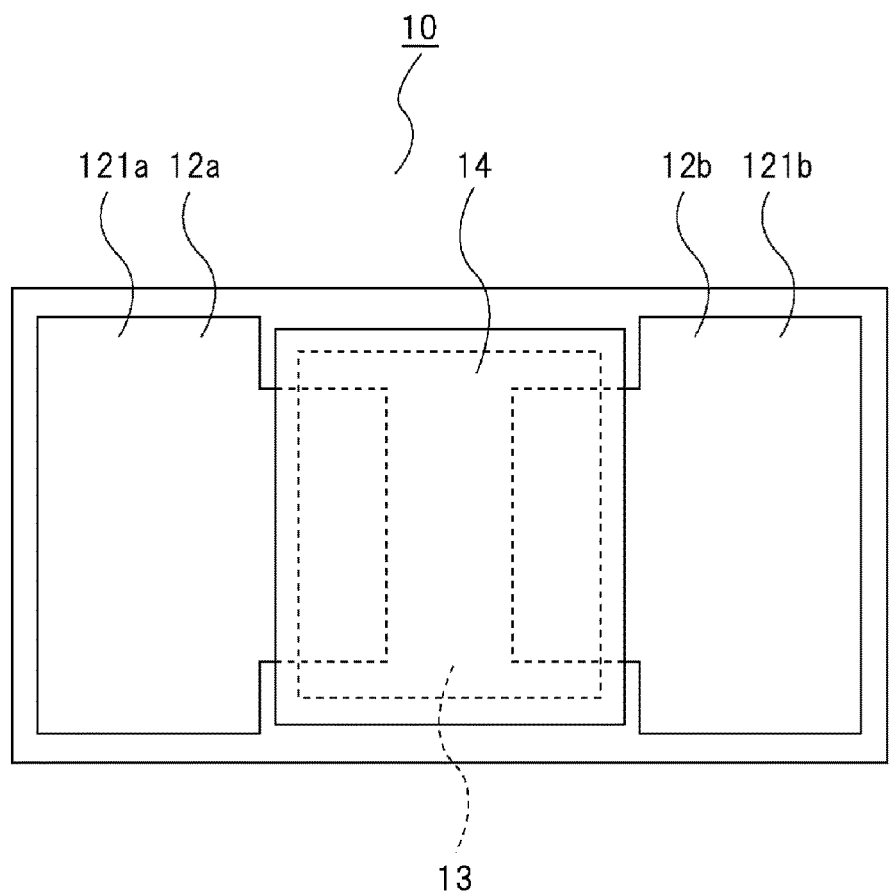
FIG. 2 is a plan view showing the heat sensitive element.
Figure 3:
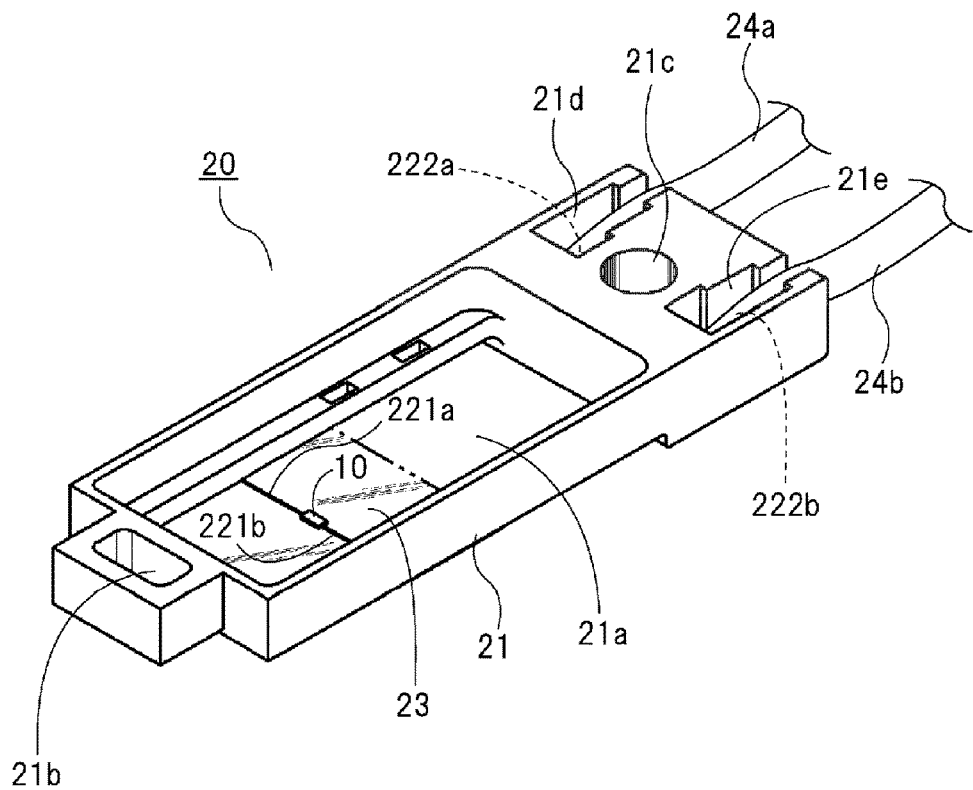
FIG. 3 is a perspective view showing a temperature sensor when seen in a front view.
Figure 4:
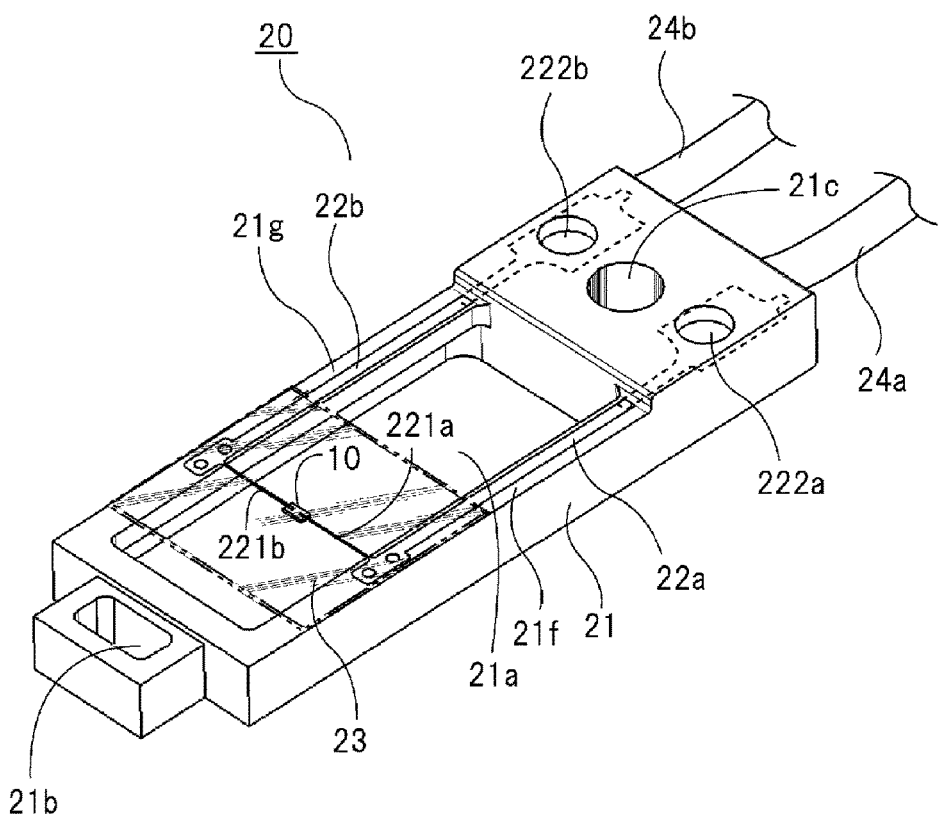
FIG. 4 is a perspective view showing the temperature sensor when seen in a back view.
Figure 5A:
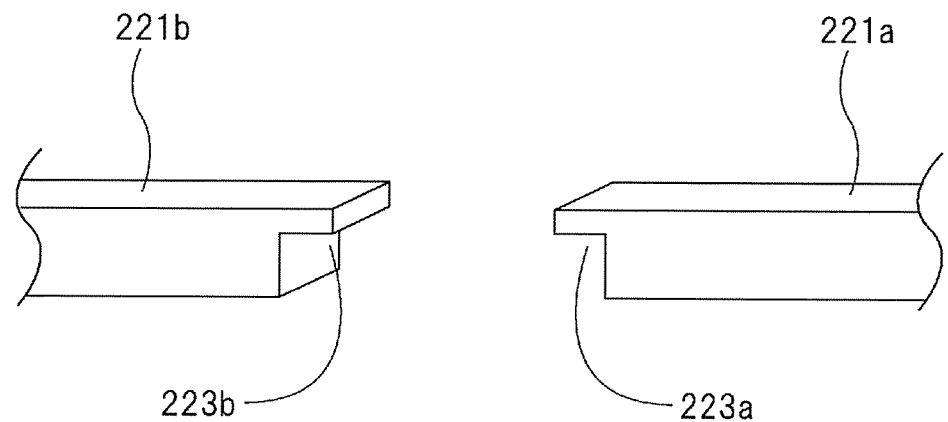
FIGS. 5(a) and 5(b) are a perspective view (lead parts) and a cross-sectional view showing a bonding part of the heat sensitive element in the temperature sensor.
Figure 5B:
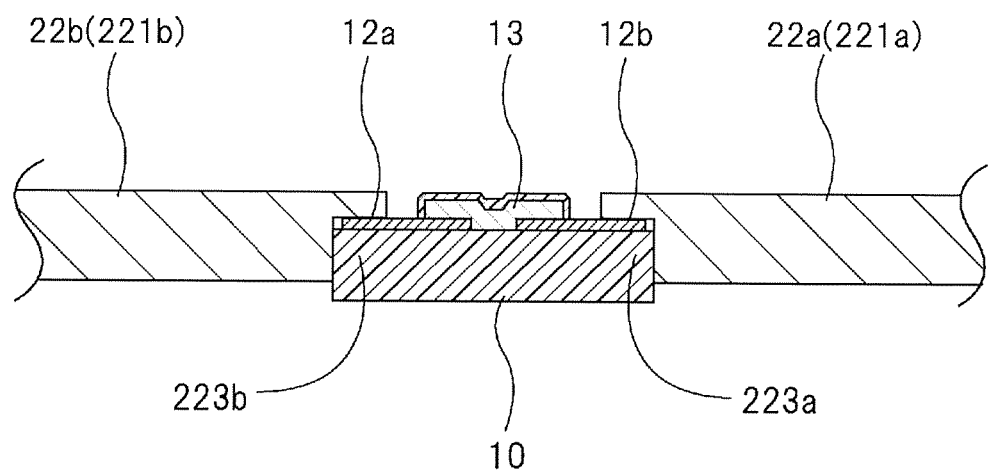
Figure 6:
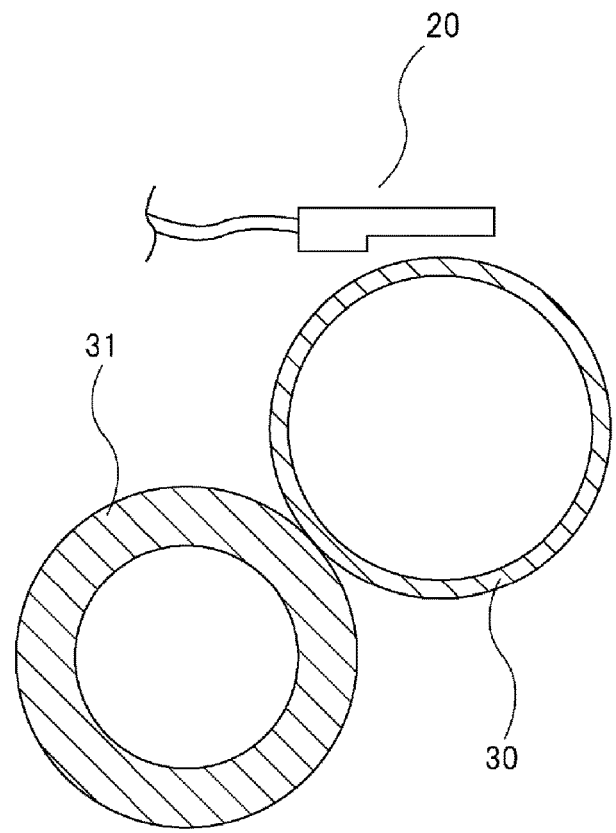
FIG. 6 is a schematic view showing a mounting state of the temperature sensor.

A first embodiment will be described with reference to FIGS. 1 to 6. FIGS. 1 and 2 show a heat sensitive element, FIGS. 3 and 4 show a temperature sensor, and FIGS. 5(a) and 5(b) show a bonding part of the heat sensitive element in the temperature sensor. FIG. 6 is a schematic view showing a mounting state of the temperature sensor.

As shown in FIGS. 1 and 2, a heat sensitive element 10 is a surface-mounted heat sensitive element, and includes an insulating substrate 11, a pair of electrode layers 12a and 12b as electrode parts, a heat sensitive film 13, and a protection film 14.

The heat sensitive element 10 is a heat sensitive resistance element, and specifically, is a thin film thermistor. The heat sensitive element 10 is formed in a substantially rectangular parallelepiped shape, the horizontal dimension is 1.0 mm, the vertical dimension is 0.5 mm, and the total thickness dimension is 100 μm. The shape and the dimensions are not particularly limited, and can be appropriately selected in accordance with the use thereof.

The insulating substrate 11 has a substantially rectangular shape and is formed using a ceramic material such as insulating zirconia, silicon nitride, alumina or a mixture of at least one of these. The insulating substrate 11 is formed to be thinned to 100 μm or less in thickness, preferably 10 μm to 80 μm. In addition, a bending strength of the insulating substrate 11 is equal to or greater than 690 MPa, and an average particle diameter of the ceramic material after baking is 0.1 μm to 2 μm. By setting the range of the average particle diameter in this manner, it is possible to secure a bending strength of equal to or greater than 690 MPa and to inhibit cracking when the thinned insulating substrate 11 is manufactured. In addition, it is possible to reduce a heat capacity due to a small thickness of the insulating substrate 11.

The pair of electrode layers 12a and 12b are formed on the insulating substrate 11, are portions to which the heat sensitive film 13 is electrically connected, and are disposed to face each other with a predetermined gap therebetween. In detail, the pair of electrode layers 12a and 12b are formed by forming metal thin films so as to have a thickness dimension of equal to or less than 1 μm using a thin film forming technique such as a sputtering method, and a noble metal such as gold (Au), silver (Ag), copper (Cu), platinum (Pt), palladium (Pd), or an alloy thereof, for example, an Ag—Pd alloy is used as the metal material.

Meanwhile, the pair of electrode layers 12a and 12b are portions to which lead parts to described later are bonded by welding, and an alloy containing gold (Au: a melting point of 1064° C.), silver (Ag: 961° C.), copper (Cu: 1085° C.), or at least one of these as a main component is preferably used as a low-melting point metal. Further, in the present embodiment, the electrode layers 12a and 12b are formed under the heat sensitive film 13, but may be formed on or in the heat sensitive film 13.

The heat sensitive film 13 is a heat sensitive thin film and is a thermistor thin film constituted by an oxide semiconductor having a negative temperature coefficient. The heat sensitive film 13 is formed on the electrode layers 12a and 12b by a thin film forming technique such as a sputtering method so as to cross the electrode layers 12a and 12b, and is electrically connected to the electrode layers 12a and 12b.

The heat sensitive film 13 consists of two or more elements selected from transition metal elements such as manganese (Mn), nickel (Ni), cobalt (Co), and iron (Fe), and consists of a thermistor material containing a composite metal oxide having a spinel crystal structure as a main component. In addition, auxiliary components may be included to improve the properties thereof. The composition and content of main components and auxiliary components can be appropriately determined according to desired characteristics thereof.

The protection film 14 covers a region where the heat sensitive film 13 is formed, and covers the electrode layers 12a and 12b by exposed parts 121a and 121b being formed so that at least portions of the electrode layers 12a and 12b are exposed. The protection film 14 can be formed by forming silicon dioxide, silicon nitride, or the like as a film by a thin film forming technique such as a sputtering method, or can be formed by forming lead glass, borosilicate glass, lead borosilicate glass, or the like by a printing method.

Next, a temperature sensor 20 on which the above-described heat sensitive element 10 is mounted will be described with reference to FIGS. 3 to 6. As shown in FIGS. 3 and 4, the temperature sensor 20 includes a holder 21, a pair of lead parts 22a and 22b, the heat sensitive element 10, and an insulation coating part 23.

The holder 21 is formed of an insulating resin material in a substantially rectangular shape which is longer in a horizontal direction, and is formed into a frame shape so as to have a rectangular opening part 21a at substantially the central portion thereof. In addition, a hooking hole part 21b is formed on one end side of the holder 21 in a longitudinal direction, and a screw hole 21c is formed on the other end side. The hooking hole part 21b and the screw hole 21c are used, for example, in a case where the temperature sensor 20 is mounted on a fixing device. Further, a pair of groove parts 21d and 21e are formed on the other end side, and a pair of external lead wires 24a and 24b are disposed in the groove parts 21d and 21e. Specifically, the external lead wires 24a and 24b are insulated-coated lead wires.

The pair of lead parts 22a and 22b are fixed to and held by the holder 21. The lead parts 22a and 22b are elastic bodies having elasticity and formed using means such as chemical etching or pressing, are narrow plate-shaped metal plates, and are lead frames. The lead parts 22a and 22b are held by the holder 21 using means such as insert molding.

In detail, the lead parts 22a and 22b are disposed on both side walls 21f and 21g of the holder 21, and one end sides thereof are integrally bent in directions orthogonal to each other, so that connection parts 221a and 221b having smaller width dimensions and connected to the heat sensitive element 10 are formed. That is, the connection parts 221a and 221b are positioned inside the opening part 21a of the holder 21 so that tip end parts thereof face each other, and the heat sensitive element 10 is connected to the tip end parts of the connection parts 221a and 221b in a bridged state. In this manner, the lead parts 22a and 22b are integrally constituted by a plate-shaped metal plate including the connection parts 221a and 221b connected to the heat sensitive element 10. Further, the other end sides are exposed to the groove parts 21d and 21e, so that terminal parts 222a and 222b are formed.

Further, in a case where tensile strength for the lead parts 22a and 22b is required, it is necessary to increase the thickness dimension of a metal plate including the connection parts 221a and 221b. In such a case, the metal plate of the connection parts 221a and 221b which is formed by thinning only the thickness dimension of the metal plate may be fixed to the lead parts 22a and 22b fixed to the holder 21 side by welding or the like.

Further, as shown in FIGS. 5(a) and 5(b), in the tip end parts of the connection parts 221a and 221b, concave parts 223a and 223b having smaller thickness dimensions than those of the other portions are formed by means such as half etching. The heat sensitive element 10 is disposed in the concave parts 223a and 223b, and the electrode layers 12a and 12b and the lead parts 22a and 22b of the heat sensitive element 10 are electrically connected to each other by welding.

Meanwhile, since the connection parts 221a and 221b (lead parts 22a and 22b) are held by the holder 21 and have a predetermined rigidity, positioning is facilitated at the time of bonding of the heat sensitive element 10.

The lead parts 22a and 22b are formed of a low-melting point metal, that is, a metal having a melting point of equal to or less than 1300° C., and a copper alloy containing copper as a main component such as phosphor bronze, constantan, or manganin is used.

In a case where the electrode layers 12a and 12b and the lead parts 22a and 22b of the heat sensitive element 10 are bonded together by, for example, laser welding, since the melting points of the lead parts 22a and 22b are equal to or less than 1300° C., the lead parts are not heated to a temperature of equal to or more than the melting point, or 1300° C. or higher when the lead parts are heated and melted using a laser beam. Therefore, the melting points of the lead parts do not exceed 1600° C. to 2100° C. which is a melting point of a ceramic substrate, and thus the lead parts 22a and 22b can be bonded while inhibiting damage to the electrode layers 12a and 12b of the heat sensitive element 10 and the insulating substrate 11 positioned directly under the electrode layers 12a and 12b. Further, in this case, since an additional material such as a bump is not used, the lead parts are not bonded in a state where a substantial amount of additional material is added to a connection (bonding) location, and the heat capacity is not increased, whereby it is possible to increase thermal responsiveness.

In the related art, an iron-based metal such as stainless steel. Kovar. or a nickel alloy is used for the above-described lead parts. Since the iron-based metal has a high melting point, and, for example, stainless steel and Kovar are all iron-based alloys, the temperature of the iron-based metal may rise to approximately 1538° C. which is a melting point of iron. When such a lead part of the high-melting point metal is irradiated with a laser beam for laser welding, the lead part and its surroundings are heated to a high temperature, which causes a problem that an insulating substrate (for example, an alumina substrate) is easily damaged. According to the above-described configuration of the present embodiment, it is possible to solve such a problem.

Meanwhile, the pair of external lead wires 24a and 24b are connected to the terminal parts 222a and 222b exposed to the groove parts 21d and 21e. The external lead wires 24a and 24b are connected to a device side such as a fixing device through a connector not shown in the drawing, or the like.

In addition, the insulation coating part 23 (shown by a dashed line in the drawing) having heat resistance such as a polyimide film is provided to adhere at least a surface side facing a detection target so as to cover at least portions of the heat sensitive element 10 and the lead parts 22a and 22b, that is, cover a portion of the opening part 21a. In the present embodiment, the insulation coating part 23, which is a translucent film, is provided to secure electrical insulation and prevent adhesion of dust. Meanwhile, the insulation coating part 23 may be formed of an insulating resin by coating.

Subsequently, an example of a mounting state of the temperature sensor 20 will be described with reference to FIG. 6. In the present example, a case where the temperature sensor 20 is mounted on a fixing device such as a copy machine or a printer is described. The heating roller 30 and the pressure roller 31 are rotatably supported, and the heating roller 30 receives a rotational driving force by a driving means not shown in the drawing. The pressure roller 31 is brought into press contact with the surface of the heating roller 30 and is disposed so as to be driven and rotated by a frictional force at a press contact part (nip part).

The temperature sensor 20 is mounted on a supporting part not shown in the drawing at a distance from the heating roller 30. The temperature sensor 20 receives heat from the heating roller 30 and detects change in resistance and performs control such that the surface temperature of the heating roller 30 is set to be a predetermined temperature.

As described above, according to the present embodiment, since the lead parts 22a and 22b held by the holder 21 are directly bonded to the electrode layers 12a and 12b of the heat sensitive element 10 by welding so as to be electrically connected thereto, the number of connection locations can be reduced as compared to that in the related art, and thus it is possible to secure reliability and improve thermal responsiveness.

Figure 7:
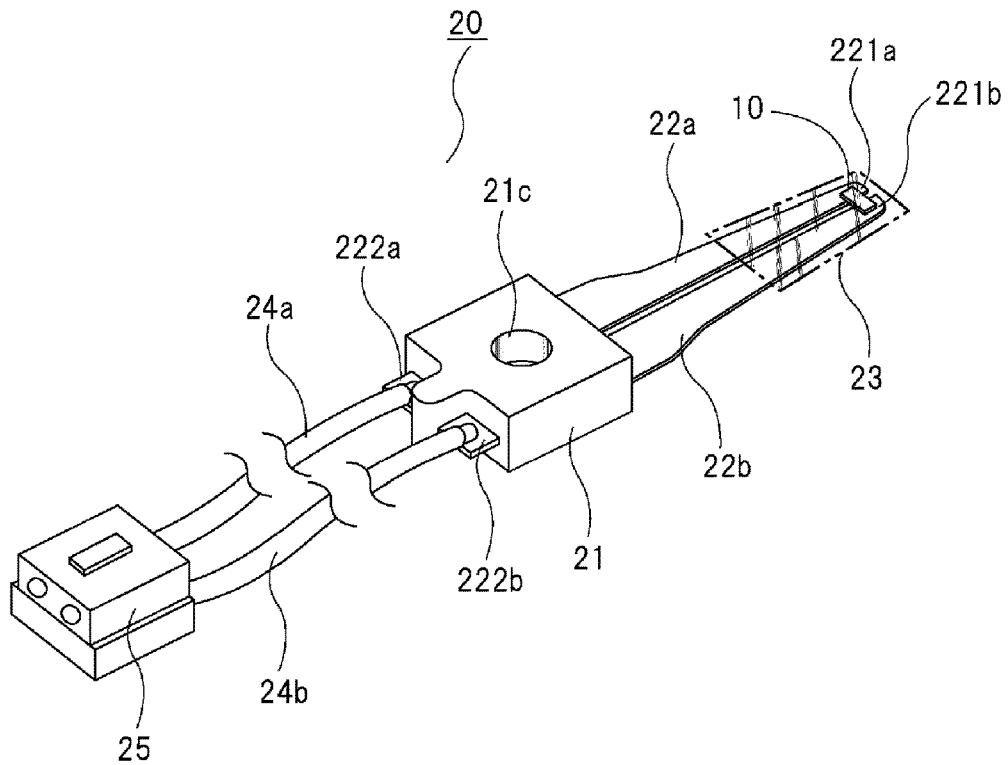
FIG. 7 is a perspective view showing a temperature sensor according to a second embodiment of the present invention.
Figure 8:
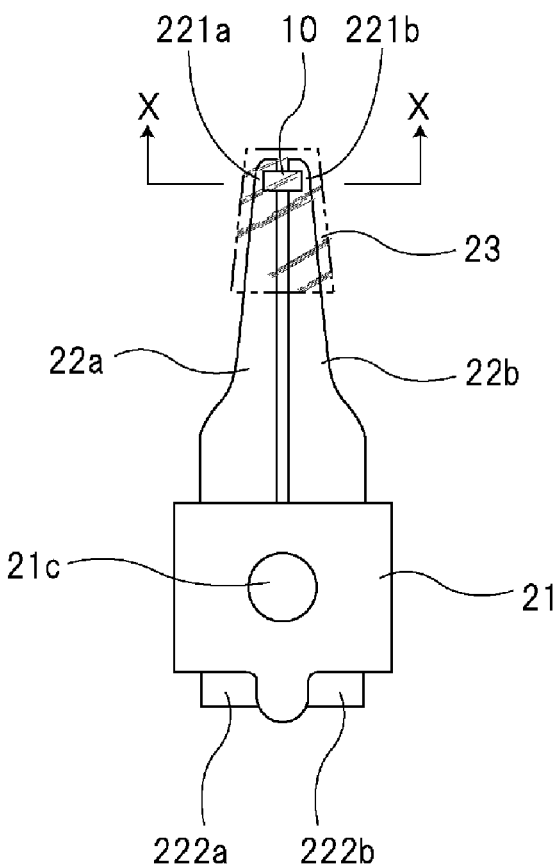
FIG. 8 is a plan view showing the temperature sensor.
Figure 9:
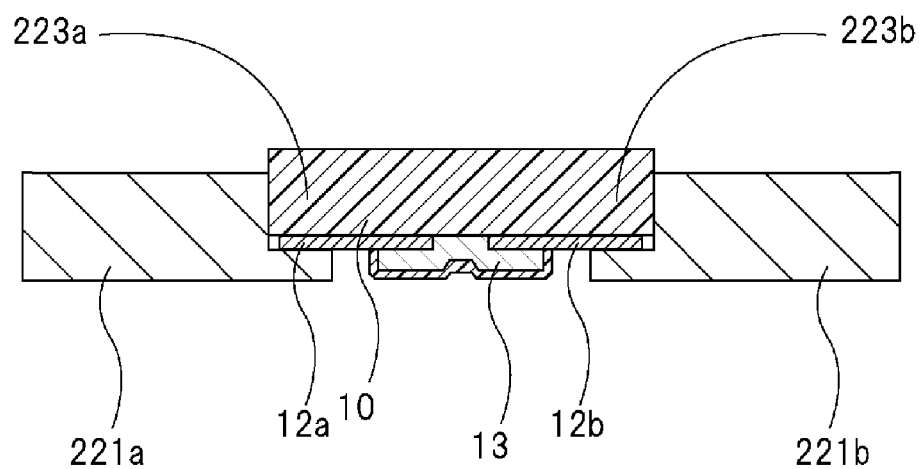
FIG. 9 is a cross-sectional view along a line X-X in FIG. 8.
Figure 10:
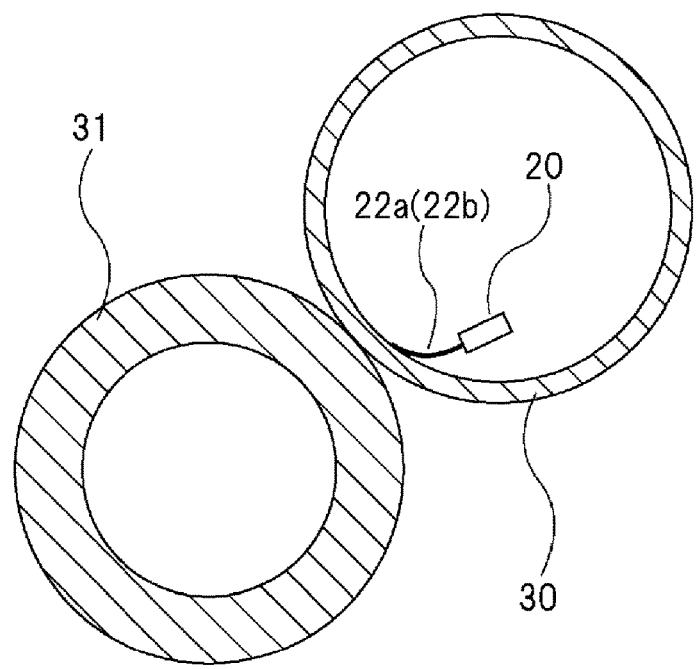
FIG. 10 is a schematic view showing a mounting state of the temperature sensor.
Figure 11:
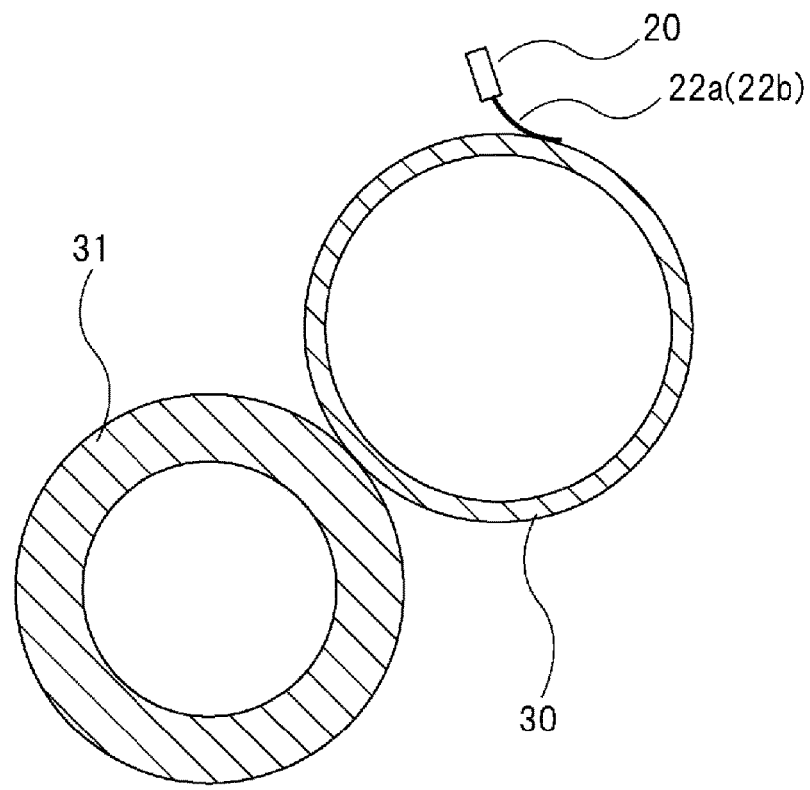
FIG. 11 is a schematic view showing a mounting state of the temperature sensor.

Next, a second embodiment will be described with reference to FIGS. 7 to 11. FIGS. 7 and 8 show a temperature sensor, and FIG. 9 shows a bonding part of a heat sensitive element in the temperature sensor. FIGS. 10 and 11 are schematic diagrams showing a mounting state of the temperature sensor. As shown in FIGS. 7 and 8, a temperature sensor 20 includes a holder 21, a pair of lead parts 22a and 22b, a heat sensitive element 10, and an insulation coating part 23.

The holder 21 is formed of an insulating resin material in a substantially rectangular parallelepiped shape. The pair of lead parts 22a and 22b are fixed to and held by the holder 21. The lead parts 22a and 22b are elastic bodies having elasticity, are narrow plate-shaped metal plates, and are held by the holder 21 using means such as insert molding. The heat sensitive element 10 is connected to one end sides (tip end sides) of the lead parts 22a and 22b.

Specifically, the lead parts 22a and 22b are configured such that the other end sides are held by the holder 21, and are formed to be tapered toward the one end sides thereof. That is, the lead parts 22a and 22b are configured such that one end sides thereof are formed as narrow parts having smaller widths than those of the other end sides, thereby forming connection parts 221a and 221b. In addition, a pair of terminal parts 222a and 222b are formed to be exposed to the other end sides. External lead wires 24a and 24b are connected to the terminal parts 222a and 222b, and the external lead wires 24a and 24b are connected to a device side such as a fixing device through a connector 25.

In addition, as shown in FIG. 9, concave parts 223a and 223b having smaller thickness dimensions are formed at the tip end parts of the connection parts 221a and 221b using means such as half etching. The heat sensitive element 10 is disposed in the concave parts 223a and 223b, and electrode layers 12a and 12b and the lead parts 22a and 22b of the heat sensitive element 10 are electrically connected to each other by welding.

Meanwhile, since the connection parts 221a and 221b are held by the holder 21 and have a predetermined rigidity, positioning is facilitated at the time of bonding of the heat sensitive element 10.

Similarly to the first embodiment, the lead parts 22a and 22b are formed of a low-melting point metal, that is, a metal having a melting point of equal to or less than 1300° C. and a copper alloy containing copper a main component such as phosphor bronze, constantan, or manganin as is used.

In a case where the electrode layers 12a and 12b and the lead parts 22a and 22b of the heat sensitive element 10 are bonded together by, for example, laser welding, since the melting points of the lead parts 22a and 22b are equal to or less than 1300° C., the lead parts are not heated to the melting point or 1300° C. or higher when the lead parts are heated and melted using a laser beam. Therefore, the melting points of the lead parts do not exceed 1600° C. to 2100° C. which is a melting point of a ceramic substrate, and thus the lead parts 22a and 22b can be bonded while inhibiting damage to the electrode layers 12a and 12b of the heat sensitive element 10 and the insulating substrate 11 positioned directly under the electrode layers 12a and 12b. Further, in this case, since an additional material such as a bump is not used, the lead parts are not bonded in a state where a substantial amount of additional material is added to a connection (bonding) location, and the heat capacity is not increased, whereby it is possible to increase thermal responsiveness.

Meanwhile, the insulation coating part 23 (shown by a dashed line in the drawing) having heat resistance such as a polyimide film adheres to at least a surface side facing a detection target so as to cover at least portions of the heat sensitive element 10 and the lead parts 22a and 22b. In the present embodiment, the insulation coating part 23 is a translucent film, but the insulation coating part 23 may be formed of an insulating resin by coating.

Subsequently, an example of a mounting state of the temperature sensor 20 will be described with reference to FIGS. 10 and 11. In the present example, similarly to the first embodiment, a case where the temperature sensor 20 is mounted on a fixing device such as a copy machine or a printer is described. FIG. 10 shows an internal-contact type, and FIG. 11 shows an external-contact type.

As shown in FIG. 10, the temperature sensor 20 is mounted on a supporting part not shown in the drawing so that the lead parts 22a and 22b are brought into surface contact with the inner circumferential surface of a heating roller 30.

In addition, as shown in FIG. 11, the temperature sensor 20 is mounted on a supporting part not shown in the drawing so that the lead parts 22a and 22b are brought into surface contact with the outer peripheral surface of the heating roller 30.

Such a temperature sensor 20 receives heat from the heating roller 30 and detects change in resistance and performs control such that the surface temperature of the heating roller 30 is set to be a predetermined temperature.

The lead parts 22a and 22b of the temperature sensor 20 of the present embodiment are elastic bodies and are configured such that one end sides thereof are formed as narrow parts having smaller widths compared to those of the other end sides. Therefore, the lead parts 22a and 22b have decreasing rigidity toward one end sides thereof. For example, when the lead parts 22a and 22b are pressed against a detection target (heating roller 30), regions close to one end sides having low rigidity are bent along the detection target, and thus it is possible to bring the lead parts into surface contact with detection targets having different curvatures. On the other hand, since rigidity is high on the other end sides, a contact pressure when coming into contact with the detection target can be secured, and thus it is possible to realize stable surface contact and improve the accuracy of temperature measurement.

As described above, according to the present embodiment, similarly to the first embodiment, since the lead parts 22a and 22b held by the holder 21 are directly bonded to the electrode layers 12a and 12b of the heat sensitive element 10 by welding and electrically connected thereto, the number of connection locations can be reduced as compared to that in the related art, and thus it is possible to secure reliability and improve thermal responsiveness.

Figure 12:
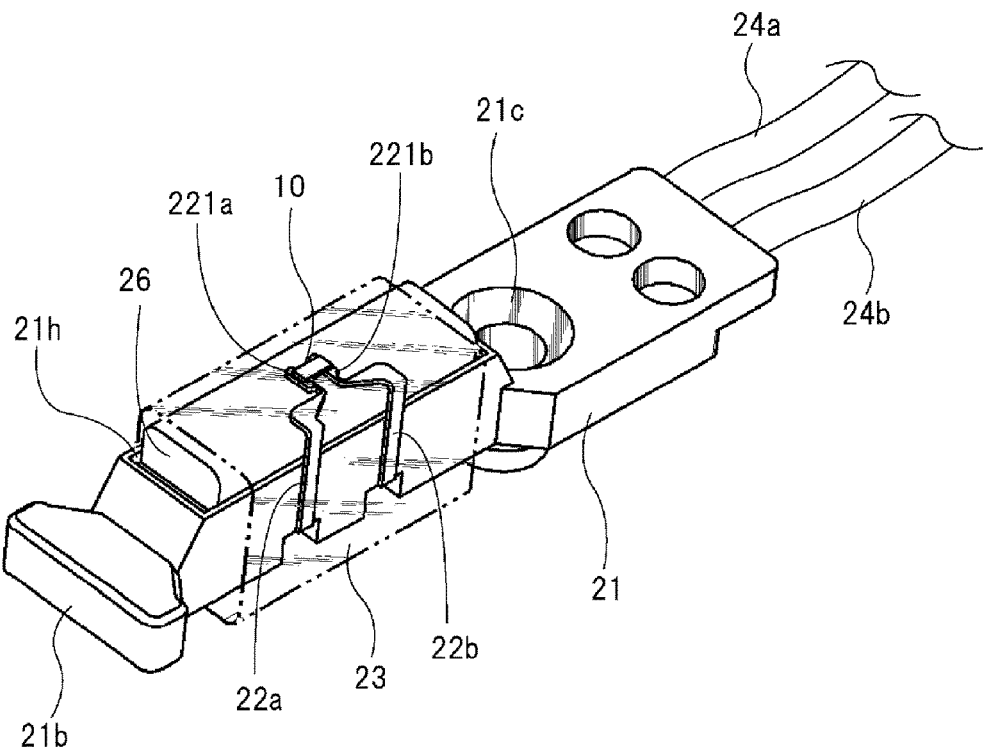
FIG. 12 is a perspective view showing a temperature sensor according to a third embodiment of the present invention when seen in a front view.
Figure 13:
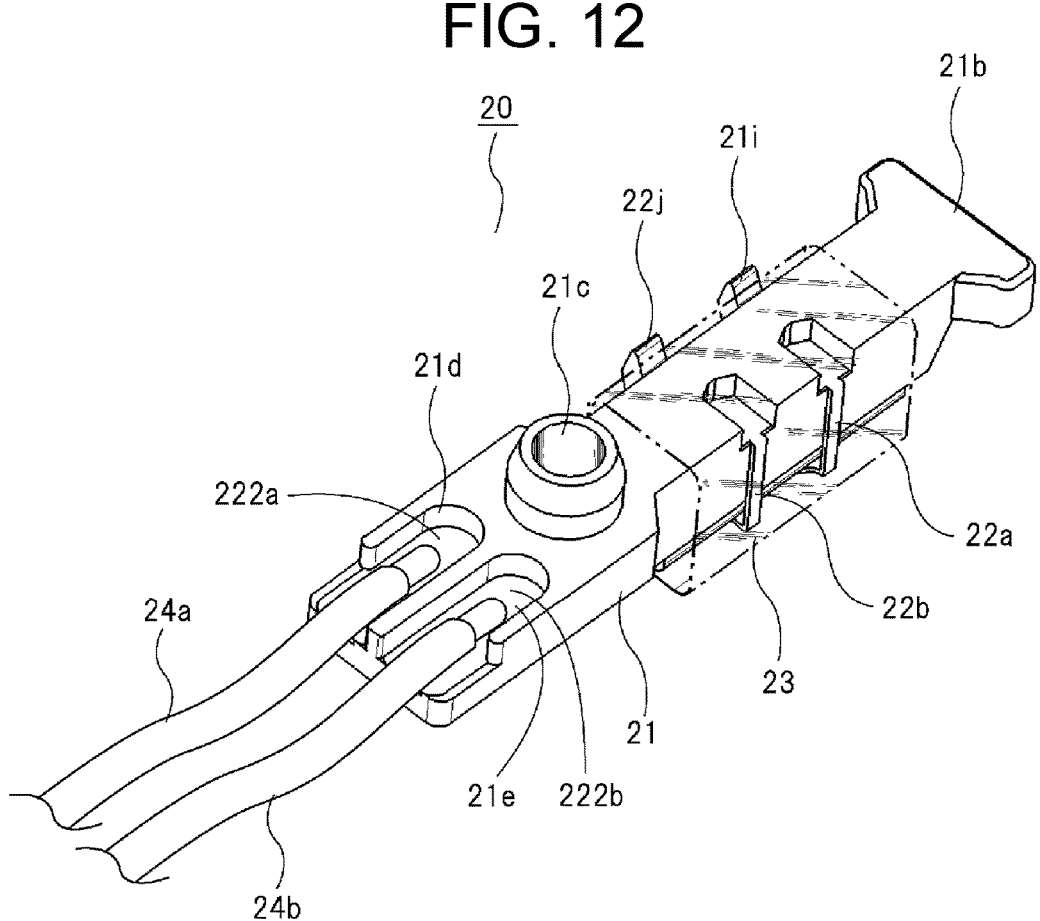
FIG. 13 is a perspective view showing the temperature sensor when seen in a back view.
Figure 14:
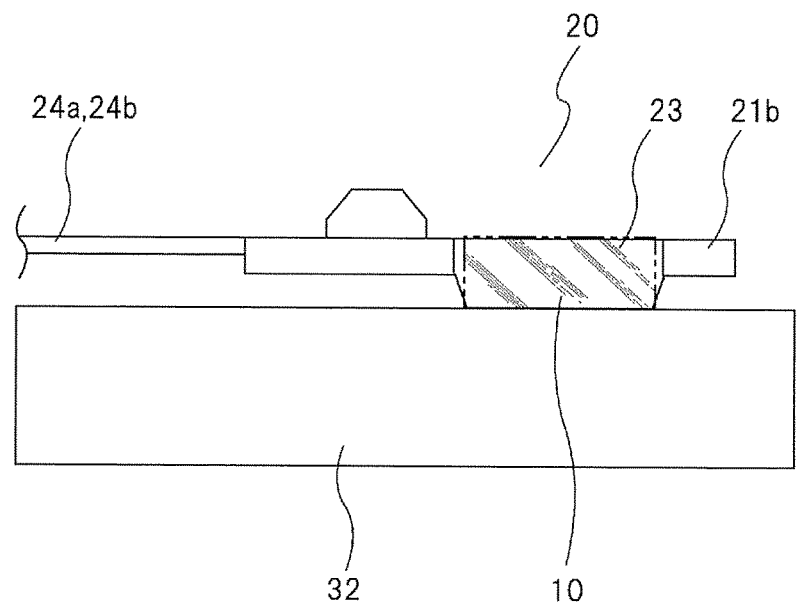
FIG. 14 is a schematic view showing a mounting state of the temperature sensor.
Figures 15A, 15B, 15C:
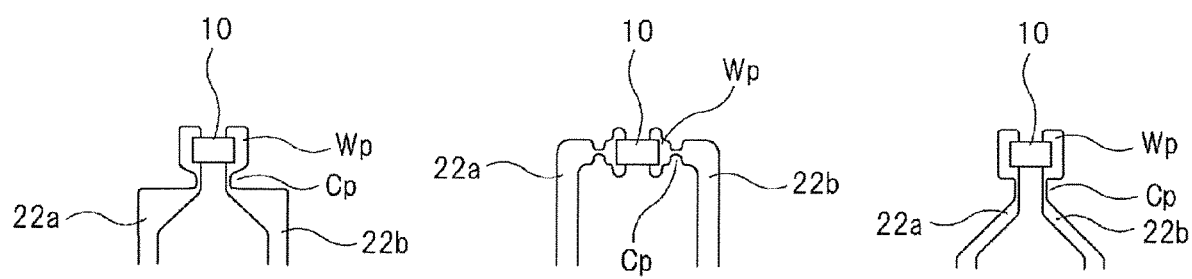
FIGS. 15(a) to 15(c) are diagrams showing a mode of connection between a heat sensitive element and lead parts in the temperature sensor.

Next, a third embodiment will be described with reference to FIGS. 12 to FIGS. 15(a) to 15(c). FIGS. 12 and 13 show a temperature sensor, and FIG. 14 is a schematic view showing a mounting state of the temperature sensor. In addition, FIGS. 15(a) to 15(c) show a mode of connection between a heat sensitive element and lead parts in the temperature sensor.

As shown in FIGS. 12 and 13, a temperature sensor 20 includes a holder 21, a pair of lead parts 22a and 22b, a heat sensitive element 10, and an insulation coating part 23. In the present embodiment, the heat sensitive element 10 is disposed by winding the pair of lead parts 22a and 22b around the holder 21.

The holder 21 is formed of an insulating resin material in a vertically long shape, has a mounting part 21h of the heat sensitive element 10 at substantially the central portion thereof, and is configured such that a hook projection part 21b is formed on one end side in a longitudinal direction and a screw hole 21c is formed on the other end side. The hook projection part 21b and the screw hole 21c are used, for example, in a case where the temperature sensor 20 is mounted on a fixing device. Further, a pair of groove parts 21d and 21e are formed on the other end side, and a pair of external lead wires 24a and 24b are disposed at the groove parts 21d and 21e. In addition, hook parts 21i and 21j protruding from the surface of the holder 21 are formed on one side surface of the holder 21. The hook parts 21i and 21j are used in a case where the insulation coating part 23 is mounted.

The pair of lead parts 22a and 22b are fixed to and held by the holder 21. The lead parts 22a and 22b are narrow metal plates having elasticity and formed using means such as chemical etching or pressing and are lead frames. The lead parts 22a and 22b are held by the holder 21 using means such as insert molding.

In detail, the lead parts 22a and 22b are formed to extend from the rear surface side of the holder 21 in a width direction (see FIG. 13), and the extending lead parts 22a and 22b are disposed to be wound around the side circumferential surface of the holder 21. As a result, the heat sensitive element 10 is disposed at the mounting part 21h of the holder 21. Further, in this case, a cushioning material 26 is mounted on the mounting part 21h of the holder 21, so that the heat sensitive element 10 is disposed on the cushioning material 26. That is, the cushioning material 26 abuts on the heat sensitive element 10, and the heat sensitive element 10 is disposed at the holder 21 through the cushioning material 26. Regarding the cushioning material 26, inorganic fiber paper made of sheeted ceramic fiber or heat-resistant nonwoven fabric is used in a case where heat resistance is required, and elastic sponge constituted by a silicone resin or a fluorine resin, rubber, heat-resistant nonwoven fabric, paper, or the like is used in a case where less heat resistance is required.

Meanwhile, the cushioning material 26 abutting on the heat sensitive element 10 can also be applied in the above-described first and second embodiments. Specifically, the cushioning material 26 may be disposed on the front side or the back side of the heat sensitive element 10. Since the cushioning material 26 can secure a contact pressure bringing the heat sensitive element into contact with a detection target by having elasticity, it is possible to realize stable surface contact and improve the accuracy of measured temperature.

Further, the insulation coating part 23 (shown by a dashed line in the drawing) having heat resistance such as a polyimide film is provided to be wound around the heat sensitive element 10 and the lead parts 22a and 22b so as to cover them. A pair of hole parts are formed on both end sides of the insulation coating part 23, the insulation coating part 23 is wound by hooking the hole part on one end side to hook parts 21i and 21j of the holder 21, and the insulation coating part 23 is fixed to the holder 21 by inserting the hole part on the other end side (terminal side) into the hook parts 21i and 21j again.

Electrode layers 12a and 12b and the lead parts 22a and 22b of the heat sensitive element 10 are electrically connected to the connection parts 221a and 221b by welding.

Meanwhile, since the connection parts 221a and 221b are held by the holder 21 and have predetermined rigidity, positioning is facilitated at the time of bonding of the heat sensitive element 10. In addition, the pair of external lead wires 24a and 24b are connected to terminal parts 222a and 222b exposed to the groove parts 21d and 21e, and the external lead wires 24a and 24b are connected to a device side such as a fixing device through a connector or the like.

Materials of the lead parts 22a and 22b and a welding method are the same as those in the above-described first and second embodiments, and a detailed description thereof will be omitted.

Subsequently, an example of a mounting state of the temperature sensor 20 will be described with reference to FIG. 14. In the present example, a case where the temperature sensor 20 is mounted on a detection target which is a stationary body will be described. The temperature sensor 20 is mounted on a supporting part not shown in the drawing so as to come into press contact with the surface of a heating body 32 which is a detection target. The temperature sensor 20 receives heat from the heating body 32 to detect a change in resistance and performs control such that the surface temperature of the heating body 32 is set to be a predetermined temperature.

In this case, since the insulation coating part 23 covers the heat sensitive element 10, the cushioning material 26, and the holder 21, it is possible to satisfactorily secure electrical insulation from the heating body 32.

Next, a mode of connection between the heat sensitive element 10 and the lead parts 22a and 22b in the present embodiment will be described with reference to FIGS. 15(a) to 15(c). FIG. 15(a) shows the above-described connection mode, and FIGS. 15(b) and 15(c) show different connection modes.

As shown in FIG. 15(a), the lead parts 22a and 22b are welded to the electrode layers 12a and 12b (the back side in the drawing) of the heat sensitive element 10. In the lead parts 22a and 22b, a conductive path is formed from a welded part Wp having a large width through a conductive part Cp having a small width and extending in a direction orthogonal to the heat sensitive element 10.

As shown in FIG. 15(b), in the lead parts 22a and 22b, a conductive path is formed from a welded part Wp having a large width through a conductive part Cp having a small width and extending in a direction parallel to the heat sensitive element 10.

As shown in FIG. 15(c), in the lead parts 22a and 22b, a conductive path is formed to further extend in an inclined direction from a welded part Wp having a large width through a conductive part Cp having a small width and extending in a direction orthogonal to the heat sensitive element 10.

According to configurations in such connection modes, heat resistance can be increased by forming a conductive part Cp having a small width as a heat-resistant part, heat radiation can be suppressed, and it is possible to increase thermal responsiveness in combination with the welding by reducing a heat capacity. In addition, similarly to the above-described first and second embodiments, the tip end parts of the connection parts 221a and 221b may be obtained by forming concave parts having smaller thickness dimensions through means such as half etching.

Meanwhile, the connection modes in FIGS. 15(a) to 15(c) can also be applied in the first and second embodiments.

As described above, according to the present embodiment, similarly to the first embodiment, since the lead parts 22a and 22b held by the holder 21 are directly bonded to the electrode layers 12a and 12b of the heat sensitive element 10 by welding so as to be electrically connected thereto, the number of connection locations can be reduced as compared to that in the related art, and thus it is possible to secure reliability and improve thermal responsiveness.

Meanwhile, in a case where solder or a conductive paste is used for bonding between a heat sensitive element and a lead part as in the related art, the thickness of the solder or the conductive paste has a thickness dimension of 30 μm to 120 μm, which results in a deterioration of responsiveness. While a thermal time constant of a temperature sensor in the related art is approximately 0.7 seconds, the thermal time constants of the temperature sensors in the respective embodiments of the present invention are 0.3 seconds or less, and thus an extremely high effect of improving a thermal time constant is confirmed.

Next, other embodiments of the heat sensitive element 10 will be described with reference to FIG. 16 (embodiment 1) and FIG. 17 (embodiment 2).

Embodiment 1

Figure 16:
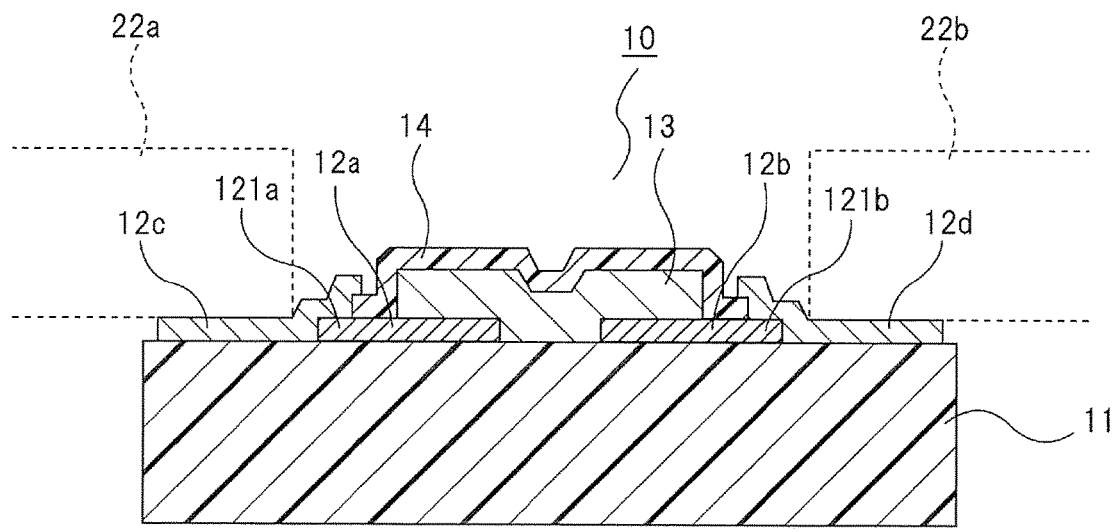
FIG. 16 is a cross-sectional view showing another embodiment (embodiment 1) of the heat sensitive element.

As shown in FIG. 16, in the present embodiment, a pair of outer electrode parts 12c and 12d connected to exposed parts of electrode layers 12a and 12b and formed on an insulating substrate 11 are provided. The outer electrode parts 12c and 12d are parts where the lead parts 22a and 22b are bonded by welding, and an alloy containing gold (Au), silver (Ag), copper (Cu) or at least one of these as a main component is used as a low-melting point metal.

Embodiment 2

In the heat sensitive element 10 of the present embodiment, the electrode parts 12c and 12d are formed of a multi-layered film, and the lead parts 22a and 22b can be bonded by welding while suppressing the damage of the insulating substrate 11.

Figure 17:
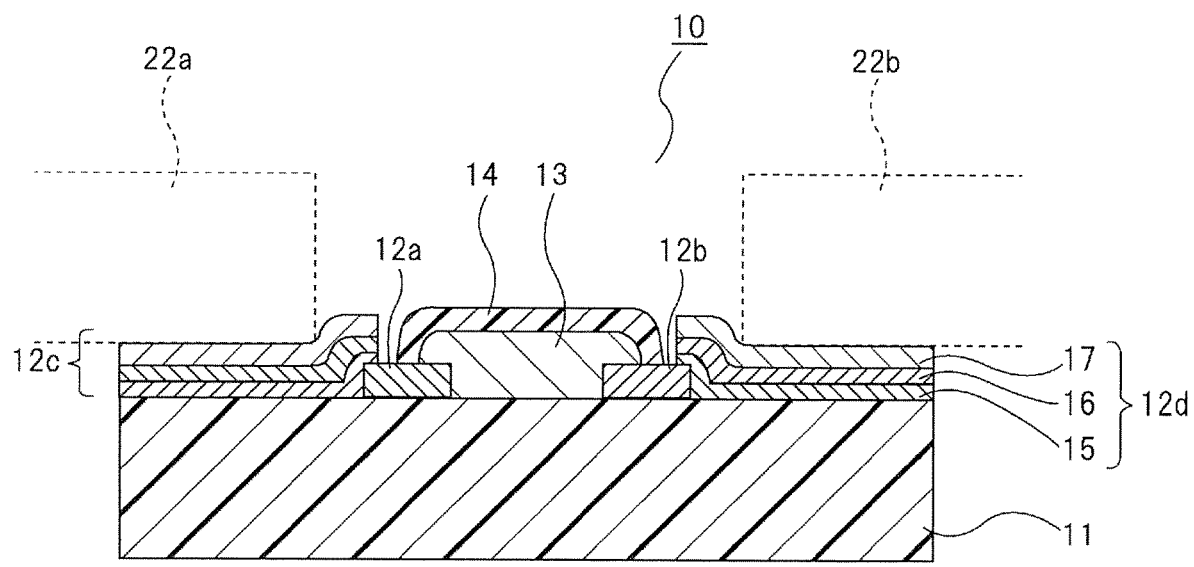
FIG. 17 is a cross-sectional view showing the embodiment (embodiment 2).
Figure 18:
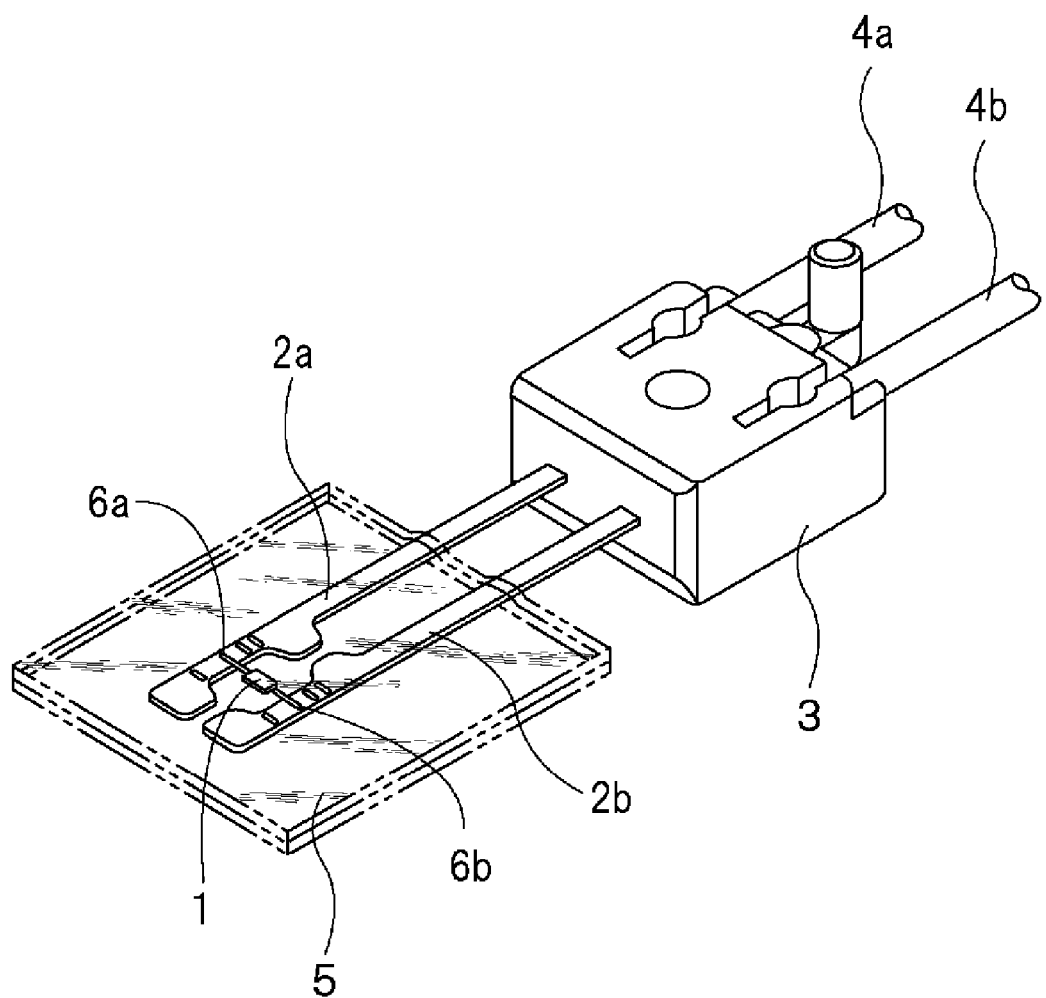
FIG. 18 is a perspective view showing a temperature sensor in an example of the related art.

As shown in FIG. 17, the heat sensitive element 10 includes an insulating substrate 11, a pair of electrode layers 12a and 12b formed on the insulating substrate 11, electrode parts 12c and 12d electrically connected to the pair of respective electrode layers 12a and 12b, a heat sensitive film 13 formed on the insulating substrate 11, and a protection film 14 formed on the heat sensitive film 13. The insulating substrate 11 is formed by being thinned to have a thickness dimension of 100 µm or less, preferably, 10 µm to 80 µm. In addition, a bending strength of the insulating substrate 11 is equal to or greater than 690 MPa, and an average particle diameter after baking a ceramic material is 0.1 µm to 2 µm. Thereby, it is possible to inhibit cracking when the thinned insulating substrate 11 is manufactured. In addition, since the insulating substrate 11 has a small thickness dimension, it is possible to reduce a heat capacity.

A pair of electrode parts 12c and 12d are formed on the insulating substrate 11 so as to face each other with a heat sensitive film 13 interposed therebetween. The pair of electrode parts 12c and 12d are electrically connected to the heat sensitive film 13 through the electrode layers 12a and 12b formed on the insulating substrate 11.

The electrode parts 12c and 12d are multi-layered films and functionally have three layers. That is, the electrode parts 12c and 12d include an active layer 15 formed on the insulating substrate 11, containing a high-melting point metal as a main component, and having an adhesive property, a barrier layer 16 containing a high-melting point metal as a main component formed on the active layer 15 as an integrated layer or an independent layer, and a bonding layer 17 containing a low-melting point metal as a main component formed on the barrier layer 16. The high melting point mentioned herein means being higher than the melting point of a low-melting point metal.

The active layer 15 is formed to be deposited on the surface of the insulating substrate 11 and has a function of increasing a bonding strength between the insulating substrate 11 formed of a material such as a ceramic and the electrode parts 12c and 12d and realizing an excellent tensile strength when the lead parts 22a and 22b are bonded to the electrode parts 12c and 12d. In addition, the active layer 15 satisfies a condition of a high melting point and specifically has a melting point of 1300° C. or more, preferably 1400° C. or more. Such a material can have a feature that it does not melt during a welding process of bonding the lead parts 22a and 22b to the electrode parts 12c and 12d. A material of the active layer 15 which satisfies the above-described function and condition is any one of titanium, chromium, zirconium, tungsten, molybdenum, manganese, cobalt, nickel, and tantalum or an alloy or oxide thereof. For example, since titanium has a melting point of 1688° C., the pure metal thereof can be used. On the other hand, for example, since manganese has a melting point of 1246° C., it can be used in the form of manganese oxide (melting point of 1945° C.) which is an oxide in a special form.

Particularly, in the related art, in order to secure a sufficient tensile strength, it is necessary to dispose an additional material for reducing thermal damage of a silver paste or a gold bump having a thickness of several tens of µm at the bonding with the lead parts 22a and 22b and to provide a glass protection layer. On the other hand, in the present embodiment, it is possible to realize a sufficient tensile strength with a thin configuration without providing any of a bump, a silver paste, and a glass protection layer by providing the active layer 15 in the electrode parts 12c and 12d.

Although the thickness of the active layer 15 is not particularly limited, the active layer can be formed to have a film thickness as small as possible within a range in which a bonding function can be held, and the active layer can be thinned to 0.01 µm in a case where the active layer is formed of a metal such as titanium. Since an active metal such as titanium has an extremely high activity, even an extremely thin film can function as an adhesive functional film.

The barrier layer 16 containing a high-melting point metal as a main component functions as a barrier layer without melting during a process of bonding the lead parts 22a and 22b to the electrode parts 12c and 12d by managing the process so as not to reach a melting point at the time of the process. When the function is performed, the barrier layer 16 of a high-melting point metal satisfies a condition that the melting point thereof is at least 1300° C. or more, preferably 1400° C. or more. A suitable material appropriate for the condition is any one of platinum, vanadium, hafnium, rhodium, ruthenium, rhenium, rhenium, tungsten, molybdenum, nickel, and tantalum, or an alloy thereof. Incidentally, the melting point of platinum is 1768° C. and the melting point of molybdenum is 2622° C.

The barrier layer 16 of a high-melting point metal is generally formed as an independent layer superimposed on the active layer 15. For example, the barrier layer 16 of a high-melting point metal made of platinum is formed on the active layer 15 made of titanium. However, the barrier layer 16 of a high-melting point metal may be formed of the same material as that of the active layer 15 or may be formed as an integrated layer.

For example, a configuration in which the barrier layer 16 of a high-melting point metal made of molybdenum is integrally or separately formed on the active layer 15 made of molybdenum can also be adopted. In this case, the active layer 15 and the barrier layer 16 of a high-melting point metal are formed through the same process.

The thickness dimension of the barrier layer 16 of a high-melting point metal is not particularly limited, but is 0.1 µm to 0.4 µm in this embodiment. This is because, when the film thickness is less than 0.1 µm, the melting point is lowered due to alloying and there is a possibility that the barrier layer will melt during a welding process. For example, when platinum is a material of the barrier layer, it is preferable to thin the barrier layer as much as possible because platinum is an expensive material, and an optimum thickness dimension can be set to, for example, 0.15 µm.

The bonding layer 17 is formed as an independent layer superimposed on the barrier layer 16 of a high-melting point metal. The bonding layer 17 melts in a process of welding the lead parts 22a and 22b to the electrode parts to thereby form a bonding structure with the lead parts 22a and 22b. In this case, the high-melting point metal does not melt at all except for the alloyed portion of the barrier layer 16. In the welding process, when heat or energy, for example, energy such as laser welding, spot welding, or pulse heat is supplied from the outside through the lead parts 22a and 22h, the bonding layer 17 is rapidly melted. In this manner, the bonding layer 17 has a function of welding to the lead parts 22a and 22b by fusion bonding. When the function is performed, the bonding layer 17 of a low-melting point metal has a condition that the melting point thereof is lower than 1300° C. A suitable material of a low-melting point metal satisfying the condition is a pure metal or an alloy containing at least one of gold (melting point of 1064° C.), silver (melting point of 961° C.), and copper (melting point of 1085° C.) as a main component.

The thickness of the bonding layer 17 is not particularly limited. However, in this embodiment, the film thickness can be reduced as small as possible and can be reduced to 0.1 μm to 0.4 μm in a case where the material of the bonding layer is, for example, gold.

The total thickness of the electrode parts 12c and 12d can be extremely reduced to 0.36 μm when the film thicknesses of the above-described three layers, that is, the active layer 15, the barrier layer, and the bonding layer are 0.01 μm, 0.15 μm, and 0.2 μm, respectively. In this manner, the electrode parts can be easily configured to have a film thickness of 1 μm or less.

Subsequently, a configuration in which the lead parts 22a and 22b are bonded to the electrode parts 12c and 12d (bonding layer 17) of the heat sensitive element 10 having the above-described configuration by welding will be described.

The lead parts 22a and 22b are bonded to the bonding layer 17 of the electrode parts 12c and 12d by performing bonding processing. Here, various welding can be widely adopted for bonding processing performed on the electrode parts 12c and 12d by the lead parts 22a and 22b. Such welding widely includes, for example, resistance welding, ultrasonic welding, and friction welding which are contact bonding, and laser welding and electron beam welding which are non-contact bonding.

The lead parts 22a and 22b are welded to the electrode parts 12c and 12d through the bonding layer 17. The lead parts 22a and 22b have a function of heating the bonding layer 17 by absorbing heat or energy (for example, energy of a laser beam) supplied from the outside without completely or mostly melting the barrier layer 16 of a high-melting point metal in a welding process for the lead parts 22a and 22b to melt together with the bonding layer 17 or melt and weld only the bonding layer 17. A material suitable for satisfying this condition is a metal or an alloy containing gold, silver, or copper of a low-melting point metal as a main component, and particularly suitable alloys are phosphor bronze, beryllium copper, brass, cupronickel, nickel silver, constantan, a copper silver alloy, a copper iron alloy, and a copper gold alloy. Incidentally, phosphor bronze has a melting point of 1000° C., and constantan has a melting point of 1225° C. to 1300° C.

The temperature sensors 20 in the above-described embodiments can be included in and applied to various devices for detecting the temperatures of fixing devices such as copy machines and printers, information communication apparatuses such as mobile communication terminals and personal computers, and electronic apparatuses such as video apparatuses, consumer equipment, and electrical apparatuses for automobiles. Devices to which the temperature sensors are applied are not specially limited.

Meanwhile, the present invention is not limited to the configurations of the above-described embodiments, and various modifications can be made without departing from the scope of the invention. Those embodiments are described as examples, and do not intend to limit the scope of the invention. Those novel embodiments may be embodied in other various modes, and may be variously omitted, substituted, and modified. Those embodiments and modification thereof are within the scope and the gist of the invention, and are within the scope of the invention described in the scope of claims and the equivalent thereof.

REFERENCE SIGNS LIST

10 Heat sensitive element
11 Insulating substrate
12a, 12b Electrode part (electrode layer)
12c. 12d Outer electrode part, electrode part
13 Heat sensitive film
14 Protection film
15 Active layer
16 Barrier layer
17 Bonding layer
20 Temperature sensor
21 Holder
22a, 22b Lead part
23 Insulation coating part
24a. 24b External lead wire
25 Connector
26 Cushioning material

What is claimed is:

1. A temperature sensor comprising:
a surface-mounted heat sensitive element which comprises at least a pair of electrode layers;
at least a pair of electrode parts connected to exposed parts of the pair of electrode layers;
lead parts which are electrically bonded to the pair of electrode parts by welding;
a holder which fixes and holds the lead parts; and
an insulation coating part which insulates at least portions of the heat sensitive element and the lead parts,
wherein the pair of electrode parts comprise an active layer containing a high-melting point metal as a main component, a barrier layer containing another high-melting point metal as a main component formed on the active layer, and a bonding layer containing a low-melting point metal as a main component formed on the barrier layer.

2. The temperature sensor according to claim 1, wherein the lead parts are plate-shaped metal plates.

3. The temperature sensor according to claim 1, wherein connection parts in the lead parts to which the heat sensitive element is bonded are formed to have smaller thickness dimensions than those of other portions.

4. The temperature sensor according to claim 1, wherein the lead part is formed of a metal material having a melting point of 1300° C. or less.

5. The temperature sensor according to claim 4, wherein the lead part is formed of a copper alloy containing copper as a main component.

6. The temperature sensor according to claim 5, wherein the lead part is formed of phosphor bronze, constantan, or manganin.

7. The temperature sensor according to claim 1, wherein thickness dimensions of the pair of electrode parts in the heat sensitive element are 1 μm or less.

8. The temperature sensor according to claim 1, wherein the heat sensitive element comprises an insulating substrate having a thickness dimension of 100 μm or less.

9. The temperature sensor according to claim 1, wherein the lead part is an elastic body.

10. The temperature sensor according to claim 1, wherein the lead part is configured such that a tip end side is a narrow part having a smaller width than that of a holder side.

11. The temperature sensor according to claim 1, wherein a cushioning material having heat resistance and elasticity abuts the heat sensitive element.

12. A device equipped with a temperature sensor, comprising the temperature sensor according to claim 1.

13. The temperature sensor according to claim 2, wherein connection parts in the lead parts to which the heat sensitive element is bonded are formed to have smaller thickness dimensions than those of the other portions.

14. The temperature sensor according to claim 2, wherein the lead part is formed of a metal material having a melting point of 1300° C. or less.

15. The temperature sensor according to claim 3, wherein the lead part is formed of a metal material having a melting point of 1300° C. or less.

16. The temperature sensor according to claim 14, wherein the lead part is formed of a copper alloy containing copper as a main component.

17. The temperature sensor according to claim 16, wherein the lead part is formed of phosphor bronze, constantan, or manganin.

18. The temperature sensor according to claim 15, wherein the lead part is formed of a copper alloy containing copper as a main component.

19. The temperature sensor according to claim 18, wherein the lead part is formed of phosphor bronze, constantan, or manganin.

* * * * *